United States Patent
Öttinger et al.

(10) Patent No.: US 6,385,956 B1
(45) Date of Patent: May 14, 2002

(54) PACKING YARN MADE OF GRAPHITE FOIL AND METAL FOIL AND METHOD OF MANUFACTURING A PACKING YARN

(75) Inventors: Oswin Öttinger, Meitingen; Bernd Schellenberger, Gersthofen, both of (DE)

(73) Assignee: SGL Technik GmbH, Meitingen (DE)

( * ) Notice: Subject to any disclaimer, the term of this patent is extended or adjusted under 35 U.S.C. 154(b) by 0 days.

(21) Appl. No.: 09/344,925

(22) Filed: Jun. 28, 1999

(30) Foreign Application Priority Data

Jun. 27, 1998 (DE) .......................... 198 28 790

(51) Int. Cl.[7] ................................. D02G 3/00
(52) U.S. Cl. ......................... 57/200; 57/1 R; 57/258; 57/295; 428/357; 428/358; 428/362; 428/363; 428/364; 428/369
(58) Field of Search ............... 57/1 R, 200, 258, 57/295; 428/357, 358, 362, 363, 364, 369

(56) References Cited

U.S. PATENT DOCUMENTS

| | | | |
|---|---|---|---|
| 3,404,061 A | 10/1968 | Shane et al. | |
| 4,455,334 A | 6/1984 | Ogino et al. | |
| 4,705,722 A | 11/1987 | Ueda et al. | |
| 4,892,320 A | 1/1990 | Tückmantel | |
| 4,961,988 A | 10/1990 | Zhu | |
| 5,134,030 A | 7/1992 | Ueda et al. | |
| 5,225,262 A | 7/1993 | Leduc | |
| 5,240,769 A * | 8/1993 | Ueda et al. | 428/365 |
| 5,370,405 A | 12/1994 | Ueda | |
| 5,509,993 A * | 4/1996 | Hirschvogel | 156/326 |
| 5,549,306 A | 8/1996 | Ueda | |
| 5,605,341 A | 2/1997 | Ueda | |
| 6,270,083 B1 * | 8/2001 | Hirschvogel et al. | 277/536 |
| 6,299,976 B1 * | 10/2001 | Tsukamoto | 428/364 |

FOREIGN PATENT DOCUMENTS

| | | |
|---|---|---|
| DE | 25 28 665 C3 | 12/1982 |
| DE | 33 20 725 A1 | 1/1984 |
| DE | 37 21 967 C1 | 12/1987 |
| DE | 38 39792 A1 | 5/1990 |
| DE | 40 14 719 A1 | 11/1991 |
| DE | 43 09 700 A1 | 9/1994 |
| EP | 0 388 481 A1 | 9/1990 |
| EP | 0 253 031 B1 | 3/1991 |
| EP | 0 444 456 A1 | 9/1991 |
| EP | 0 340 303 B1 | 6/1993 |
| EP | 0 601 670 A1 | 6/1994 |
| EP | 0 616 884 A2 | 9/1994 |
| EP | 0 466 923 B1 | 10/1995 |
| EP | 0 681 125 A1 | 11/1995 |
| EP | 0 794 367 A2 | 9/1997 |
| GB | 2 243 883 B | 3/1994 |
| GB | 2 285 067 A | 6/1995 |

* cited by examiner

Primary Examiner—John J. Calvert
Assistant Examiner—Shaun R Hurley
(74) Attorney, Agent, or Firm—Laurence A. Greenberg; Werner H. Stemer; Gregory L. Mayback

(57) ABSTRACT

A packing yarn and a method of manufacturing a packing yarn composed of at least two bands which are at most 5 mm wide and are joined together by a yarn manufacturing method, include forming the bands of a laminate having at least one layer of flexible graphite and at least one layer of a metal foil with a tensile strength of at least 250 MPa. The layers of graphite foil and metal foil are joined by adhesion or through the use of a non-adhesive-like coupling agent. The bands are produced from the laminates by cutting, which is preferably effected continuously. Advantages thereof are that strips or bands of flexible graphite, which have a tensile strength that is totally inadequate for the manufacture of packing yarns, are altered in terms of their mechanical properties. That is performed solely through reinforcement with a metal foil and without using further reinforcing agents such as, for example, yarns, fibers or wires, in such a way that they may be processed by known methods into packing yarns in an efficient manner.

43 Claims, 4 Drawing Sheets

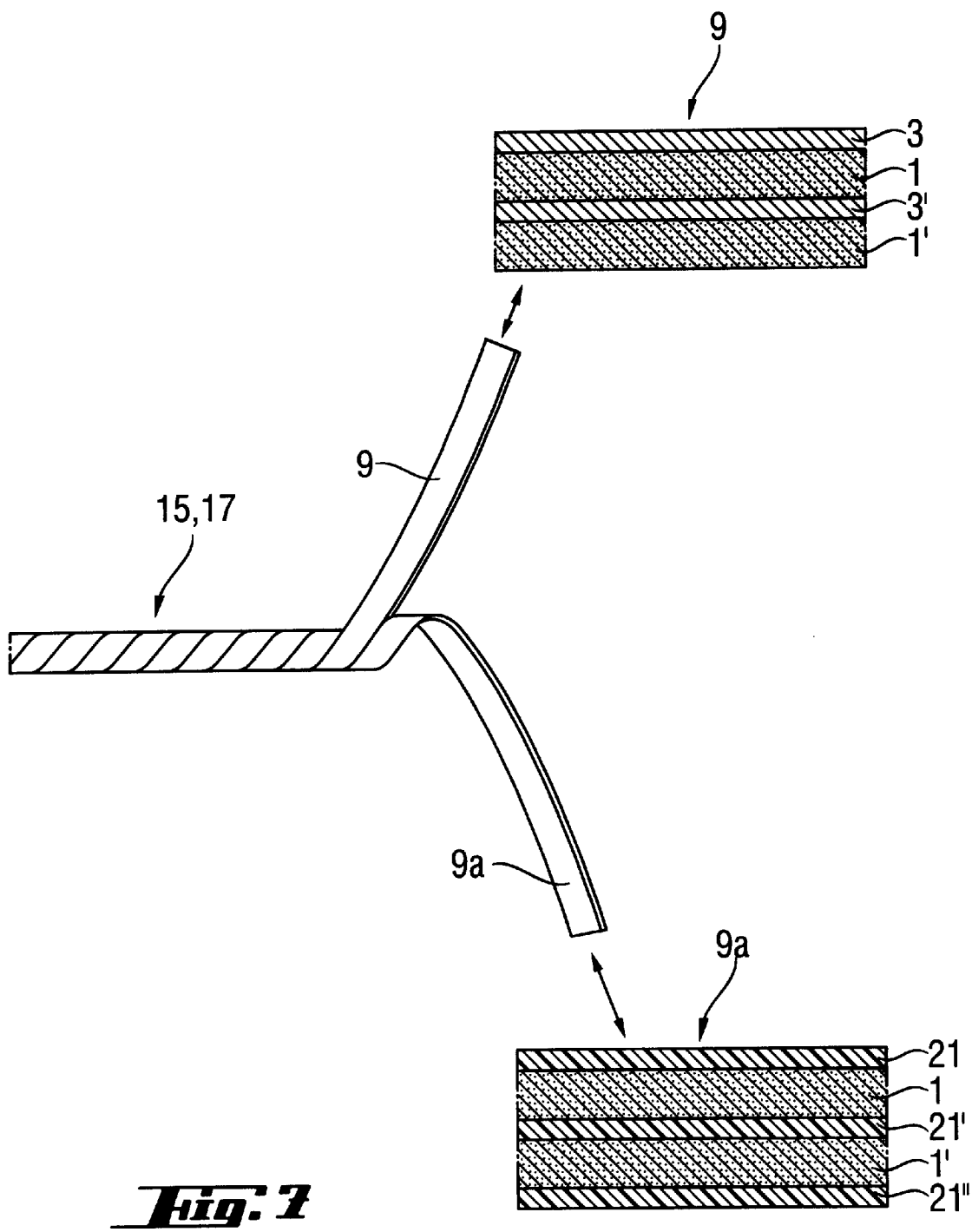

PACKING YARN MADE OF GRAPHITE FOIL AND METAL FOIL AND METHOD OF MANUFACTURING A PACKING YARN

BACKGROUND OF THE INVENTION

Field of the Invention

The invention relates to a packing yarn including at least two bands joined to one another by a yarn manufacturing method and formed of a laminate having at least two mutually joined and alternately disposed layers of two laminar materials, including firstly at least one layer of flexible graphite and secondly at least one layer of a reinforcing agent or medium, wherein both outer flat sides of top and bottom layers of the laminate are formed of flexible graphite or only one of the flat sides is formed of flexible graphite or none of the flat sides is formed of flexible graphite. An example of such a packing yarn is formed of at least two twisted-together bands of a laminate of only one layer of flexible graphite, which is joined at least at one of its two flat sides to at least one reinforcing agent.

Packing yarns of the type described above are used to manufacture seals and, in particular, packings for sealing shaft and spindle glands. According to a known method, two or more packing yarns are combined for that purpose, using a textile processing method such as, for example, braiding, into a cord or plait and then portions of such cords or plaits that are cut to a specific, predetermined length are compressed in a suitable pressing mould to form a packing ring. A plurality of such packing rings produce a stuffing-box packing, once they have been inserted into the appropriate packing space of a stuffing-box. According to another known method, portions of a cord or plait made from the packing yarns, which have been cut to length and correspond to the dimensions of a specific packing space, are inserted directly into the packing space and the packing which is thus produced and is still highly compressible, is tightened up by the gland until tightness of the packing configuration is achieved. According to a third method, the packing yarns or packing cords or plaits manufactured from them may be wound directly around a shaft or spindle having a gland which is to be sealed, until the quantity of packing yarn or packing plait necessary for producing the required packing has been wound on. Then the winding which is thus produced may be tightened up with the aid of the gland, after embedding in the packing space, until tightness of the packing configuration is achieved.

Packing yarns of the type described above are manufactured i.e. by using flexible graphite or expanded graphite. Expanded graphite is obtained by briefly heating graphite salts or intercalation compounds of graphite in the form of an open vermicular material. The flexible graphite is obtained by compressing the expanded graphite which is thus obtained. That is generally produced in the form of graphite foils or graphite plates (see, for example, U.S. Pat. No. 3,404,061). In order to manufacture packing yarns or packing cords or plaits through the use of e.g. braiding, knitting or twisting processes, the graphite foils are cut into strips or bands of a specific width and those strips are then further processed into cords, plaits or strands. Despite a specific flexibility, the strips or bands of flexible graphite tear and/or break during such processing methods because their tensile strength, in particular, is too low. For that reason, a great many possible ways of overcoming the previously mentioned problems associated with manufacturing packing materials from flexible graphite have been indicated.

In one group of solutions to the problem, a substrate of a sufficiently high tensile strength is used, which is finished with a coupling agent, e.g. an adhesive. The substrate is covered with expanded graphite and the expanded graphite and the substrate are pressed together. It is possible to use metal wires, synthetic or natural fibers or yarns, woven fabrics and foils of various types as the substrates. The ropes or bands which are thus obtained are then optionally once more additionally reinforced with yarns, fibers or wires, e.g. by being surrounded by a knitted or braided fabric, or in some other manner, and further processed by using the known processing methods such as braiding into initial products for packings (European Patent Application 0 388 481 A1, corresponding to U.S. Pat. No. 4,961,988; and European Patent 0 466 923 B1, corresponding to U.S. Pat. No. 5,370,405).

According to another group of solutions, use is made of graphite foils which have been cut into strips. In that regard, European Patent 0 253 031 B1, corresponding to U.S. Pat. No. 4,705,722, describes the superimposition of bands of flexible graphite having a width of at most 5 mm, which are then surrounded by a braided or knitted fabric made from a fibrous material. The strands which are thus obtained are then further braided into plaits, which are suitable as an initial material for the manufacture of packings. According to European Patent 0 466 923 B1, corresponding to U.S. Pat. No. 5,370,405, graphite foil strips having a width of at most 5 mm are joined through the use of adhesives to reinforcing organic, inorganic or metal filaments. The reinforced foil strips are processed by braiding, etc. into plaits and the plaits are once more surrounded by a reinforcing fiber braided fabric before being further processed into packings. European Patent Application 0 681 125 A1 discloses the cutting of wide rolls of graphite foils into rolls of reduced width. Foil bands which are thus obtained are provided with a transversely extending embossing or fluting, the fluted foil bands are cut into comparatively narrow strips around 2 mm in width, and the narrow, fluted strips are combined into a rope and surrounded with a reinforced fiber braided fabric. According to European Patent 0 340 303 B1, corresponding to U.S. Pat. No. 5,240,769 and U.S. Pat. No. 5,134,030, strips of graphite foil cut to a width of at most 5 mm are covered with organic, inorganic or metal yarns, fibers or foils and thereby reinforced. The reinforced graphite foil strips are additionally equipped with a further reinforcement of fibers, in the course of further processing into braidable or twistable packing yarns. With that technical solution, a plurality of strips of graphite foil may also be superimposed and processed. According to European Patent Application EP 0 794 367 A2, graphite foil bands having a width of more than 6 mm may be reinforced with a plurality of agents, such as wires, bands, yarns of inorganic, metal or organic agents, and then braided into packing cords or plaits. In that case as well, the graphite foils may be reinforced by a surface coating of plastic material or by laminating with a plastic material. However, a width of the graphite foal bands, which are provided for braiding or knitting, of more than 5 mm is disadvantageous, as is evident from the disclosures of European Patent 0 253 031 B1 or European Patent 0 340 303 B1. Such foils are difficult to process and produce packing cords of a less dense structure.

For that reason, folding techniques are preferentially used when processing wider bands and layers of graphite foils. For instance, European Patent Application 0 444 456 A1 teaches that individual foil bands or a plurality of superimposed foil bands are folded at right angles to their longitudinal direction and a packing ring may be obtained from the folded formed body either directly or after the folded formed body has been surrounded by a braided fabric of yarns, fibers or wires. Prior to folding, for reinforcing purposes, the foil bands may additionally be combined with yarns, fibers or woven fabrics or such reinforcing agents may be placed between the foil layers prior to folding. An insertion of corrosion-resistant plastic foils which preferably additionally have sliding properties, such as e.g. polytetrafluoroethylene foils, is also described. However, such plastic foils are not used for reinforcement purposes. According to U.S. Pat. No. 5,605,341 and U.S. Pat. No. 5,549,306, wide graphite foil bands are folded along their longitudinal direction into the shape of an S or a spiral, with it being possible to insert fiber reinforcements prior to or during folding. In order to provide further reinforcement, the strands which are thus obtained are then additionally surrounded by fibers by braiding or knitting to render them suitable for the manufacture of packings. U.S. Pat. No. 5,225,262 teaches the embossing of longitudinal profiles in graphite foils and the graphite foils which are thus prepared are folded at least once parallel to the course of the longitudinal profiling. The folded formed bodies are then surrounded by a yarn, preferably made of INCONEL, using e.g. a braiding or knitting technique, and are then calibrated. The strands which are thus produced are then braided into a packing cord, which is calibrated and then once more surrounded by a braided fabric made from a temperature-resistant, high-strength yarn. UK Patent Application GB 2 285 067 A discloses placing graphite foil webs, which may be coated with adhesive, in a plurality of superimposed layers and covering at least one of the surfaces of such layered structure with fibers or yarns, which extend parallel to the longitudinal extension of the layered structure and do not cross. The foil layered structures covered with fibers are then cut parallel to the fibers or yarns into strips and the ropes which are thus obtained are folded or rounded in such a way as to produce a strand, which includes a graphite foil core with an outer covering of fibers or yarns running parallel in longitudinal direction. The outer reinforcement with fibers or yarn is intended to prevent wearing-down of the foil graphite when pressure is applied.

European Patent Application 0 601 670 A1 teaches a further method of manufacturing packing yarns or packing bands using graphite foil bands. In that case, graphite foil bands are initially provided at one of their surfaces with an adhesive layer to which a yarn with a reinforcing effect is applied. The graphite foil band provided with the reinforcing yarn is then drawn through a conically tapering nozzle and subsequently pressed flat between two rollers. During that operation, the band is first rounded and then formed, with simultaneous binding-in of the reinforcing yarn and bonding together of the inner-lying surfaces of the graphite foil, into a braidable band which may then be processed into initial products for the manufacture of packings or directly into packings. Application of the adhesive may be effected through the use of a foil coated on both sides with adhesive. However, the foil is not used for reinforcement purposes.

In the previously described solutions for manufacturing packing yarns, packing cords, packing bands or packings, either fibers for reinforcing the graphite foils and/or graphite foil bands, which have a low tensile strength, or combinations of fiber reinforcements and foils, are used. The purposeful application and frictional connection of fibers onto the graphite foil is comparatively difficult and the process of surrounding the outside of graphite foils or graphite foil bands with braided fabric is comparatively costly. In addition, in almost every case it is necessary to incorporate at least two reinforcements into the graphite foil bands in order to give them an adequate tensile strength and lend the resulting packing rope good functional properties. When a reinforcement of the graphite foil bands using foils made of different materials is selected, either an additional reinforcement through the use of yarns, fibers or wires or, as in the case of European Patent Application EP 0 794 367 A2, the use of graphite foil bands having a width of 6 mm or more, is necessary.

SUMMARY OF THE INVENTION

It is accordingly an object of the invention to provide a packing yarn made of graphite foil and metal foil and a method of manufacturing a packing yarn, which overcome the hereinafore-mentioned disadvantages of the heretofore-known products and methods of this general type, which provide a packing yarn that is predominantly made of deformable graphite, does not contain fibers, yarns or wires as reinforcing material, has a high resistance to tearing, is eminently suitable for processing into packings using all conventional methods, including twisting, braiding and knitting methods and which may be manufactured in a minimal number of easy process steps.

With the foregoing and other objects in view there is provided, in accordance with the invention, a packing yarn, comprising at least two bands each having a width of at most 5 mm, the bands formed of a laminate, and the bands joined to one another by a yarn manufacturing method; the laminate formed of mutually joined, alternately disposed layers of at least two laminar materials; the layers including a top layer and a bottom layer with outer flat sides; and the layers including at least one first layer of flexible graphite having a thickness of at most 1 mm and a bulk density in the region of 0.7 to 1.8 $g/cm^3$, and at least one second layer of a reinforcing agent formed of metal foil selected from the group consisting of nickel, nickel alloys, iron, iron alloys, steel, stainless steel, copper, copper alloys, aluminum and aluminum alloys having a thickness in the region of 5 to 50 $\mu$m and a tensile strength of at least 250 MPa. Both, one or none of the top and bottom layers with the outer flat sides are formed of flexible graphite.

With the objects of the invention in view, there is also provided a packing yarn, comprising at least two bands each having a width of at most 5 mm, the bands formed of a laminate, and the bands joined to one another by a yarn manufacturing method; the laminate formed of at least one layer of flexible graphite having two flat sides, and at least one layer of reinforcing agent joined to at least one of the two flat sides; the at least one layer of flexible graphite having a thickness of at most 1 mm and a bulk density in the region of 0.7 to 1.8 $g/cm^3$; and the at least one layer of reinforcing agent formed of a metal foil selected from the group consisting of nickel, nickel alloys, iron, iron alloys, steel, stainless steel, copper, copper alloys, aluminum and aluminum alloys having a thickness in the region of 5 to 50 $\mu$m and a tensile strength of at least 250 MPa.

With the objects of the invention in view, there is additionally provided a method of manufacturing a packing yarn, which comprises joining at least one of two flat sides of a flexible graphite web layer to at least one metal foil layer of a reinforcing agent selected from the group consisting of nickel, nickel alloys, iron, iron alloys, steel, stainless steel, copper, copper alloys, aluminum and aluminum alloys having a thickness in the region of 5 to 50 $\mu$m and a tensile strength of at least 250 MPa to form a foil composite laminate, in a first step; cutting the foil composite laminate into at least two bands at most 5 mm in width, in a second step; and processing at least two of the bands obtained after the second step into a yarn by using a textile processing method, in a third step.

With the objects of the invention in view, there is also provided a method of manufacturing a packing yarn, which comprises alternately superimposing and joining together at least one flat side of at least two first layers of flexible graphite on at least one second metal foil layer of a reinforcing agent selected from the group consisting of nickel, nickel alloys, iron, iron alloys, steel, stainless steel, copper, copper alloys, aluminum and aluminum alloys having a thickness in the region of 5 to 50 μm and a tensile strength of at least 250 MPa, in a first step to form a foil composite laminate having each of the flat sides of the graphite layers inside the foil composite laminate joined to a metal foil layer; cutting the foil composite laminate into at least two bands at most 5 mm in width, in a second step; and processing at least two of the bands obtained after the second step into a yarn by using a textile processing method, in a third step. The foil composite laminate is provided with top and bottom layers having outer flat sides; none, one or both of the flexible graphite layers are placed at one of the outer flat sides; and none, one or both of the outer flat sides are joined to a metal foil.

The packing yarn according to the invention is composed of two or more than two bands which are joined together into a yarn or a strand using textile processing methods, such as, for example, braiding, knitting, weaving or twisting.

Twisting is preferred due to its simplicity and the low cost associated with achieving a good product quality. The at least two bands of the laminate, which are to be joined together to form a packing yarn, preferably have a rectangular or square cross section and are non-twisted. It is, however, possible for at least one of them to be twisted separately prior to processing into a packing yarn. Laminate bands made of graphite foils and metal foils are often comparatively stiff.

In accordance with another feature of the invention, for this reason, in many cases it is advantageous for the bands, prior to being processed into packing yarns, or even the finished laminates, prior to being split into bands, to be provided with a fluting or corrugation. The fluting or corrugation extends transversely to the longitudinal extension of the bands or the subsequent bands and is advantageously introduced by an embossing process. The number of bands which may be combined into a packing yarn is limited in an upward direction by the working method which is used.

In accordance with a further feature of the invention, generally up to 12 bands are combined by twisting into packing cord. Preferably, however, 2 to 6 bands are twisted together. The number of bands which are to be combined into a packing yarn also depends upon the width and thickness of the bands.

In accordance with an added feature of the invention, the width should not exceed 5 mm if high-quality packing yarns are to be obtained. In the case of most processing methods and applications, band widths of at most 3 mm and band thicknesses of at most 2 mm have proved successful. When particularly thin or flexible packing yarns are to be manufactured, the use of bands having a width of at most 2 mm and a thickness of at most 1 mm is recommended. The specified ratios of width to thickness represent advantageous band cross sections. A link between these values for the bands does not exist. In extreme cases, bands having a width of 5 mm and a thickness of below 0.35 mm may also be used. If the bands are to be capable of being processed by using one of the previously described methods at all, they are required to have a specific minimum tensile strength and they are also required to have a suitable tensile strength for further processing into packing yarns, packing cords, packing plaits or into packings. They are also required to lend the packings manufactured from them specific properties, more details of which will be provided below. Since the graphite foils alone and the bands which may be manufactured from graphite foils alone have a totally inadequate tensile strength and resistance to tearing, the tensile strength of the bands of a laminate, which are described in the context of the present invention, is determined by the tensile strength of the metal foils joined to the graphite foils. In order to provide bands which are to be suitable for further processing into packing yarns, the inventors have discovered that it is not enough to use just any metal foils. Rather, for the purpose of the invention, it is necessary to select metal foils which do not exceed a specific thickness, have a specific minimum tensile strength and may be joined in some manner to the graphite foil. The tensile strength of these metal foils should therefore be at least 250 MPa and preferably more than 400 MPa.

In accordance with an additional feature of the invention, the thickness of each of the metal foils used in the packing cord is to be at most 50 μm. Preferably, its thickness is in the region of 10 μm to 30 μm. It should, however, be not less than 5 μm. The graphite foils, which are used to manufacture the laminate and the bands made from the laminate, should not have too loose a structure, nor should they be too stiff. If they were too open or not sufficiently mechanically stable, even when combined with the metal foils in the laminate bands, they would have too strong a tendency to crumble. If they were too rigid, they would not be flexible enough for processing and use. The graphite foils should also not be too thick, if they are to remain sufficiently flexible. For this reason, their thickness is limited to at most 2 mm and preferably to less than 1 mm, and their bulk density is limited to the region of 0.7 to 1.8 g/cm$^3$ and preferably to the region of 1.0 to 1.4 g/cm$^3$. The laminate bands, from which the packing yarn is manufactured, are to be not wider than 5 mm and preferably not wider than 3 mm so that they may be processed with one another without difficulty by using the previously described textile methods, in particular twisting or braiding. In the case of most applications, widths of 2 mm and less are also advantageous.

In order to guarantee the high temperature stability of the packing yarns and prevent corrosion of the materials lying adjacent the packings made of the packing yarns according to the invention, the flexible graphite in the packing yarns should only have a low impurity content.

In accordance with yet another feature of the invention, the carbon content of the graphite foils is generally to be at least 96% by weight and preferably at least 99% by weight.

The bands, from which the packing yarns are manufactured by using textile methods, may include one layer of graphite foil and one layer of a metal foil which is joined to the graphite foil. It is, however, often more advantageous to combine more than one layer of flexible graphite with more than one layer of metal foil to form a laminate. In such a laminate, each layer of graphite foil is followed by a layer of metal foil and all of the foils are joined to one another. The number of foils which are superimposed depends upon the respective practical conditions and the manufacturing outlay.

In accordance with yet a further feature of the invention, generally no more than four graphite foils are combined in a suitable manner with metal foils to form a laminate. Preferred laminates contain 2 to 3 graphite foils. The outer flat sides of the graphite foils of the laminates may be free of any covering. However, one or both of these two flat sides may carry, and be joined to, a metal foil. The choice of which of the three variants is selected depends upon the intended subsequent use of the packing manufactured from the packing yarns.

In accordance with yet an added feature of the invention, one or both of the outer flat sides of a laminate, of which each may be made both of graphite and of metal, is covered by and joined to a plastic foil from the group of perfluorinated polymeric hydrocarbons, polyesters and polyimides. Of the perfluorinated polymeric hydrocarbons, polytetrafluoroethylene and tetrafluoroethylene-perfluoropropylene copolymers are particularly preferred. Foils of these materials have an excellent chemical resistance, good temperature resistance and excellent sliding properties. They therefore fit well into the performance spectrum of the described laminates and help to prevent sticking of the graphite packings to materials which restrict the packing space.

All metal foils, which meet the previously described tensile strength conditions, are sufficiently corrosion-resistant and may be joined to the graphite foils, are suitable as reinforcing foils. Preferably, these metal foils are formed from the group of the following metals or metal alloys, provided these alloys have the previously described material properties: nickel, alloys with nickel as the main component, iron, iron alloys with iron as the main component, stainless steel, copper, copper alloys with copper as the main component, aluminum, aluminum alloys with aluminum as the main component. The use of metal foils made of pure nickel, which is preferably obtained by precipitation from electrolytes, or made of corrosion-resistant steel, is particularly preferred. The advantage of the previously described metal foils as components in packing materials lies moreover, as with the graphite foils, in their resistance to high and very high operating temperatures combined with practically no material loss. Thus, packings which have been manufactured from packing yarns made of graphite foils and metal foils according to the present invention, are also usable under extreme operating conditions and even under such operating conditions they present good compressibility and recovery properties combined with no settling or only a low degree of settling.

In accordance with again another feature of the invention, where the adjustment of specific properties, e.g. with respect to the processing properties of the laminate bands or the sliding properties of the packing yarns and the packings manufactured therefrom, so requires, the laminates and the bands manufactured from the laminates may also contain one or more layers of a plastic foil or plastic foils. The foils used for this purpose are preferably made of perfluorinated polymeric hydrocarbons, polyester or polyimide.

In accordance with again a further feature of the invention, in the present case, foils made of a perfluorinated polyhydrocarbon are used. The plastic foils in these cases may be joined both directly to one flat side of a graphite foil or to one flat side of a metal foil. In this way, the following sequences of foil layers may be realized, after having selected any flat side of a graphite foil directed towards the inside of the laminate as an initial surface: (–) graphite foil-metal foil-plastic foil-graphite foil-metal foil-; (–) metal foil-graphite foil-plastic foil-graphite foil-metal foil; (–)graphite foil-metal foil-plastic foil-metal foil-graphite foil-. In all of these variants, each graphite foil of a given laminate is to be joined at one of its flat sides to a reinforcing metal foil.

According to another variant of the invention, the packing yarn may be formed of at least two bands of at least two different laminates, which are joined and preferably twisted together by using a yarn manufacturing method. The first band type in this case is formed of a laminate of at least one graphite foil and at least one metal foil of the type described above, and the other band type is formed of a laminate of at least one graphite foil and at least one plastic foil, with the plastic foil having a tensile strength of at least 25 MPa and an elastic modulus of at least 0.4 GPa. The second band type is manufactured from laminates such as have been described in German Published, Non-Prosecuted Patent Application DE 198 28 789 A1, corresponding to U.S. application Ser. No. 09/344,928 (Attorney's Docket No. SGL 98/3) filed on the same date as the instant application.

In accordance with again an added feature of the invention, the metal foils may be coined to the graphite foils through the use of adhesives or without the use of adhesives. A determination as to which of the possible joining methods is selected in each individual case has to be made by the person skilled in the art through the use of experiments which are easy to conduct. All adhesives which wet the surfaces of the graphite foils and metal foils may be used. However, the strength of joint achieved through adhesion is required to be at least high enough to guarantee processing of the laminate produced by adhesion into bands and further processing of the bands into the packing yarns. It is possible, for example, to use acrylate-based, polyamide-based, polysiloxane-based and polyurethane-based adhesives and acetylated organic polymers as well as epoxide resin adhesives and phenolic adhesives. Packings made of packing yarns of this type may present a low degree of settling under high-temperature operating conditions, which may be compensated by slightly retensioning the gland.

In accordance with again an additional feature of the invention, the graphite foils may also be joined to the metal foils with the aid of the method according to European Patent Application 0 616 884 A2, which operates without the use of adhesives and instead uses a special coupling agent. In the context of the present invention, that method of joining the graphite foils to the metal foils is also to be regarded as an adhesive-free method. Packings made of packing yarns of this type are, like the previously described packing yarns and packings, resistant to corrosion and high temperatures and, even at very high operating temperatures, present practically no settling properties as well as only a negligibly low material loss. The joining of the graphite foils to the plastic foils may be effected in accordance with German Published, Non-Prosecuted Patent Application DE 198 28 789 A1, corresponding to U.S. application Ser. No. 09/344,928 filed on the same date as the instant application. This is done with the aid of the previously mentioned adhesives by adhesive-bonding or by adhesive-free bonding by welding at temperatures approaching or within the softening range of the plastic foils and by simultaneously applying a moderate contact pressure of at least 0.1 MPa and preferably of 0.5 to 6 MPa or with the aid of the method according to European Patent Application 0 616 884 A2, which operates without the use of adhesives and instead uses a special coupling agent. The metal foils may be joined to the plastic foils with the aid of the previously mentioned adhesives or by welding under the previously described conditions. Metal foils, which have already been covered at one of their flat sides with plastic material may also be used in the manufacture of laminates made of graphite foils and metal foils.

The packing yarns, which are obtained through the use of a textile processing method such as, for example, the braiding or in particular twisting of two or more laminate bands, may be further processed directly into packings. They may, however, alternatively be further processed e.g. by twisting or braiding first into packing cords, from which packings are then manufactured using known methods. Instead of using laminate bands having substantially planar surfaces for yarn manufacture, such bands having planar surfaces may first each be individually twisted, prior to being twisted or braided together. Then these already individually twisted bands may be processed, either on their own or in combination with bands which have not been previously twisted, into packing yarns.

If the surface of the packing yarns, after they have been manufactured e.g. by twisting or braiding, is not uniform enough, the packing yarns may be additionally calibrated prior to further processing. During this operation, which may be effected by one of the known apparatuses, the packing yarns and the laminate bands therein are further compressed and the packing yarns are given a cross section, which is required or desired for the subsequent application and is preferably round, elliptical, oval, rectangular or square. Packing yarns of this type, which have been calibrated in this manner, particularly when they are composed of wider and/or a higher number of laminate bands, are comparatively rigid. For this reason, packing yarns of this type are calibrated only when it is necessary.

A further description of the invention follows with the aid of exemplary embodiments:

EXAMPLE 1

A 500 mm wide, 50 m long and 0.2 mm thick graphite foil web having a bulk density of 1.2 g/cm$^3$ was uniformly coated at one of its flat sides in a quasi-continuous process in a laminating machine (manufactured by: Billhöfer, Nuremberg, Germany) through the use of an adhesive spreading roller and a doctor blade with an aqueous two-component acrylate adhesive, which contained the prescribed quantity of hardener (adhesive and hardener manufactured by Morton International GmbH, Bremen, Germany). The graphite foil web coated with the hardener-containing adhesive was then totally covered in the same installation on the adhesive-coated side by a likewise 500 mm wide and 13 µm thick nickel foil (superpure nickel, supplied by: INCO Alloys International, England). The foil sandwich being formed of the graphite foil and the nickel foil was then conveyed over a hardening roller set to a temperature of around 70° C. and afterwards the foils were bonded to the graphite foil web through the use of a setting roller. Using the same method, the laminate web which is thus produced was then joined at its uncovered nickel flat side with a second graphite foil identical to the previously described first graphite foil so that, as an end product, a laminate web having a total length of 50 m, a width of 500 mm and a total thickness of around 0.4 mm was obtained, having the following laminated structure: 1. graphite foil, 2. nickel foil, 3. graphite foil. This laminate web was then divided into narrow bands around 1 mm in width. To this end, the 500 mm wide web was cut firstly on a longitudinal cutting machine (manufactured by: HSM, Bad Oeynhausen, Germany) into 50 mm wide bands and then on a cutting machine having cutting cylinders (manufactured by: JOMRO Textiltechnik GmbH, Eschwege, Germany) into bands approximately 1 mm wide. Corresponding methods were also used in the following exemplary embodiments to divide the webs into narrow laminate bands. Immediately after longitudinal cutting, the narrow laminate bands were fed through a pair of embossing rollers and thereby provided at both sides with fine grooves, which extend transversely to the longitudinal direction of the bands (transverse fluting/transverse corrugation). In order to manufacture a packing yarn, six of these 1.0 mm wide bands of the laminate were twisted by a twisting machine (manufactured by: ALLMA, type AZBT, Kempten) into a yarn in such a way that the yarn had around 30 turns per meter of yarn length. In tensile strength tests on the finished yarn, a force at rupture of 68 N was measured. In the case of these tests, the sample length was 800 mm, the free clamping length 200 mm and the drawing-off speed 50 mm/min. The measurements were carried out with a tensile testing machine manufactured by Zwick, Ulm, Germany, using grip heads of the type 8314 (manufactured by: Zwick, Germany). This method of determining the tensile strength of the yarns was also used for the yarns described with respect to the following exemplary embodiments, as was the method of determining the material loss which is now described. In order to determine the material loss at comparatively high temperatures, around 1 m long portions of the yarn were exposed for an hour to hot air of a temperature of 300° C. in a forced-air oven. Afterwards, the material loss was about 1.3%. After a further hour of treatment under these conditions, the material loss was below 0.25%.

EXAMPLE 2

In this example, the laminate web for the manufacture of bands for further processing into packing yarns had the following sequence of layers: 1. PTFE foil, 2. graphite foil, 3. stainless steel foil, 4. graphite foil, 5. PTFE foil. Its manufacture was effected in two different process steps in this case. In the first process step, the surface of a 1430 mm wide, 0.2 mm thick graphite foil having a bulk density of 1.2 g/cm$^3$ was completely covered by an equally wide, 50 µm thick PTFE foil, type TFM 1700, (supplied by: Dyneon, Burgkirchen, Germany) and welded through the use of a double belt press. The pad pressure of the press was 20 bar, the pad temperature 370° C. and the throughput rate of the press 2 m/min. In this way, two graphite foil webs covered at one side with PTFE foil were produced. In the second process step, the two previously manufactured composite foils made of graphite and PTFE were joined at their free graphite flat sides to a 25 µm thick stainless steel foil (material No. 1.4401, manufactured by: Ugine, France) using the method according to European Patent Application 0 616 884 A2. To this end, the stainless steel foil was first drawn through a bath of a coupling agent solution being formed of a siloxane/fatty alcohol mixture (supplied by: Wacker Chemie, Munich, Germany) and the coupling agent situated at both sides of the metal foil was spread through the use of doctor blades and distributor rolls uniformly in a thin layer on both flat sides of the metal foil and then dried through the use of a radiant heater. The entire surface of the special steel foil was then covered at its two flat sides with the graphite flat sides of the two laminate webs made of PTFE foil and graphite foil manufactured in the first process step and the superimposed layers were bonded to one another in a double band press at a temperature of 170° C. As with the joining of the graphite foils to the PTFE foils in the first process step, in this case too the pad pressure was 20 bar and the throughput rate 2 m/min. This multilayer laminate web was longitudinally split in two stages into a band width of 1.5 mm in the manner described in Example 1. The bands which were thus produced had a thickness of 0.5 mm. Without the introduction of a transverse corrugation or fluting but otherwise according to the method described in Example 1, three such bands were twisted into a packing yarn having around 30 turns per running meter. The yarn had a tensile strength of 90 N. Its material loss, after treatment for one hour at 300° C. in air in the forced-air oven, was less than 0.1%.

EXAMPLE 3

In this exemplary embodiment, three 500 mm wide, 0.25 mm thick and 50 m long graphite foils, which had a bulk density of 1.0 g/cm$^3$, were glued to two likewise 500 mm wide and 50 m long but 13 μm thick nickel foils (supplied by: INCO Alloys International, England) in such a way that each flat side of the two nickel foils was completely covered by a graphite foil. This laminating operation was effected quasi-continuously in accordance with the method described in Example 1 with the aid of a laminating machine (manufactured by: Billhöfer Maschinenfabrik, Nuremberg, Germany) but using a polyamide adhesive (AQ-Nylon, supplied by: Toray, Japan). The laminate web which is thus produced, having the layer sequence graphite foil/nickel foil/graphite foil/nickel foil/graphite foil, was split using the procedure described in Example 1 in two stages into bands having a final width of 1.5 mm. These bands had a thickness of around 0.7 mm. After the final cutting operation, the 1.5 mm wide bands were provided with a transverse corrugation through the use of embossing rollers. Then, three of these bands were twisted by the twisting machine described in Example 1 into a yarn having 20 turns per running meter of yarn. The tensile strength of this yarn was 42 N. After treatment for one hour at 300° C. in air in a forced-air oven, the material loss was 0.4%.

EXAMPLE 4

In this example, a laminate web having the layer sequence graphite foil/metal foil/graphite foil was manufactured substantially using the method described in Example 1. In this case, however, unlike in Example 1, a 25 μm thick special steel foil (source of purchase: Ugine, France) was used as a metal foil and the polyamide adhesive, which was also used in Example 3, was used as an adhesive. The thickness of each of the two graphite foils used was 0.5 mm and their bulk density was 1.0 g/cm$^3$. Joining together of the three foil bands produced a laminate web having a length of 50 m, a width of 500 mm and a thickness of 1 mm. The latter was split into 2.5 mm wide bands using the procedure described above. These bands were then fed through two embossing rollers and thereby provided with a transverse fluting. Then, in each case two of the fluted bands were twisted by the twisting machine into a packing yarn having 20 turns per running meter. The average tensile strength of this yarn was 76 N and the material loss after treatment for one hour in air in the forced-air oven was 0.4%.

All of the packing yarns manufactured according to Examples 1 to 4 were capable of being twisted or braided into packing cords using the conventional methods and could also be wound directly into packings.

There now follows a description of the general course of manufacture of a packing yarn with reference to the diagram shown in Table 1, which represents the manufacture of a packing yarn made of graphite foils and metal foils.

TABLE 1

Diagram illustrating the method of manufacturing packing yarns

Stage I

Unwind foils
Coat foils with adhesive or coupling agent
Superimpose foils
Join foils to form a laminate
(pressure + optionally temperature)
variant 1: join by an adhesive
variant 2: join by a coupling agent in accordance
with European Patent Application 0 616 884 A2

Stage II

Cut laminate into bands
Optionally, emboss a fluting/corrugation

Stage III

Use textile method to process bands into packing yarns

Generally, the course of manufacture includes three stages: in a first process stage a laminate is manufactured from which, in a second process stage, bands are produced that, in a third process stage, are processed into a packing yarn.

In the first process stage, layers of graphite foil regularly alternating with layers of the reinforcing metal foil are superimposed in such a way that the layers of the various types of foil always completely cover one another. Advantageously, for this purpose the metal foils and graphite foils are unwound from rolls and, without being cut into pieces of a specific length, are further processed in a continuous process. They may, however, alternatively be cut into webs of a specific length and further processed discontinuously or quasi-discontinuously into packing yarns. However, the last method is used more rarely for larger-scale manufacture of packing yarns.

If the foil layers are to be joined together through the use of an adhesive, before superimposition at least one of the two foil surfaces, which are to be joined together, has to be provided with the adhesive. The adhesive has to be applied as thinly as possible onto the surfaces. Suitable adhesives are preferably adhesives from the group of acrylates, polysiloxanes, polyurethanes, polyamides, acetylated organic polymers, epoxide resins and phenolic resins. In order to carry out joining, the foil sandwich is subjected to a pressure of at least 0.1 MPa, and of at most 5 MPa and, given the use of thermally hardenable adhesives, the foil sandwich is subjected additionally to the required temperature. If joining is to be effected using the method in accordance with European Patent Application 0 616 884 A2, a substance acting as a coupling agent is applied onto at least one of the foils to be joined. During application, however, care has to be taken to ensure that the substance acting as a coupling agent is applied in a very thin layer and spread particularly evenly. The joining itself is effected under a pressure of at least 0.5 MPa and at a minimum temperature of 130° C.

When, according to one of the variants of the invention, laminates are to be manufactured in which, in addition to the graphite foils and metal foils joined together for reinforcement purposes, flat sides of graphite foils or metal foils are joined to plastic foils, in principle the same joining techniques are used as have been described above for the graphite foils and metal foils. However, in these variants it is additionally possible to weld the plastic foils to the graphite foils or metal foils. in this case, the foils to be joined are joined under the required temperature and pressure conditions, without coating the surfaces to be joined with an adhesive or coupling agent. When joining the graphite foils or metal foils to high-quality polyester foils, temperatures in the range of 240 to 270° C. and a pressure of at least 0.1 MPa, preferably of 3 MPa, are used. When the graphite foils or metal foils are to be joined to plastic foils from the group of polyimide and perfluorinated polymeric hydrocarbons, temperatures in the range of 350 to 380° C. and a pressure of at least 0.1 MPa, preferably of 2 to 3 MPa, are required.

The laminates manufactured in process stage 1 are cut longitudinally in process stage 2 by cutting devices such as, for example, cutting cylinder sets, into laminate bands of a width required for further processing in process stage 3. The bands which are thus manufactured may be either further processed directly in a continuous process or they may be wound individually or combined into a group, onto bobbins. In order to make the laminate bands flexible enough for processing into packing yarns using a textile method, either the laminates prior to splitting into bands, or preferably the bands themselves, are provided with a fluting or corrugation running transversely to the longitudinal extension of the bands. This may be effected by known embossing machines or embossing tools such as, for example, embossing rollers.

In process stage 3, the bands manufactured in process stage 2 are processed into packing yarns using one of the known methods. Preferably, use is made in this case of a twisting method. However, where necessary, braiding or another method may be used. In order to produce so-called hybrid yarns, i.e. yarns composed of laminates of differing structures in the context of the invention, firstly bands substantially made of graphite foils and metal foils and secondly, bands made of graphite foils and plastic foils are combined in specific ratios and/or configurations during manufacture and processed into packing yarns. In this way, the properties of such hybrid yarns may be purposefully adjusted depending on the number and composition of the bands contained therein.

The packing yarns which are thus manufactured are generally further processed directly into packing cords or other initial products for the manufacture of packings or alternatively directly into packings. Where it is desirable or necessary, the packing yarns may be additionally calibrated to a specific cross section. In this way, the surfaces of the packing yarns are smoothed and the yarns themselves are further compressed. They do, however, lose some of their flexibility as a result.

Other features which are considered as characteristic for the invention are set forth in the appended claims.

Although the invention is illustrated and described herein as embodied in a packing yarn made of graphite foil and metal foil and a method of manufacturing a packing yarn, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a plan view of a packing yarn, which is composed of bands of two different laminates shown in cross section, namely firstly a band of graphite and metal foils and secondly a band of graphite and plastic foils.

DESCRIPTION OF THE PREFERRED EMBODIMENTS

Figure 1:
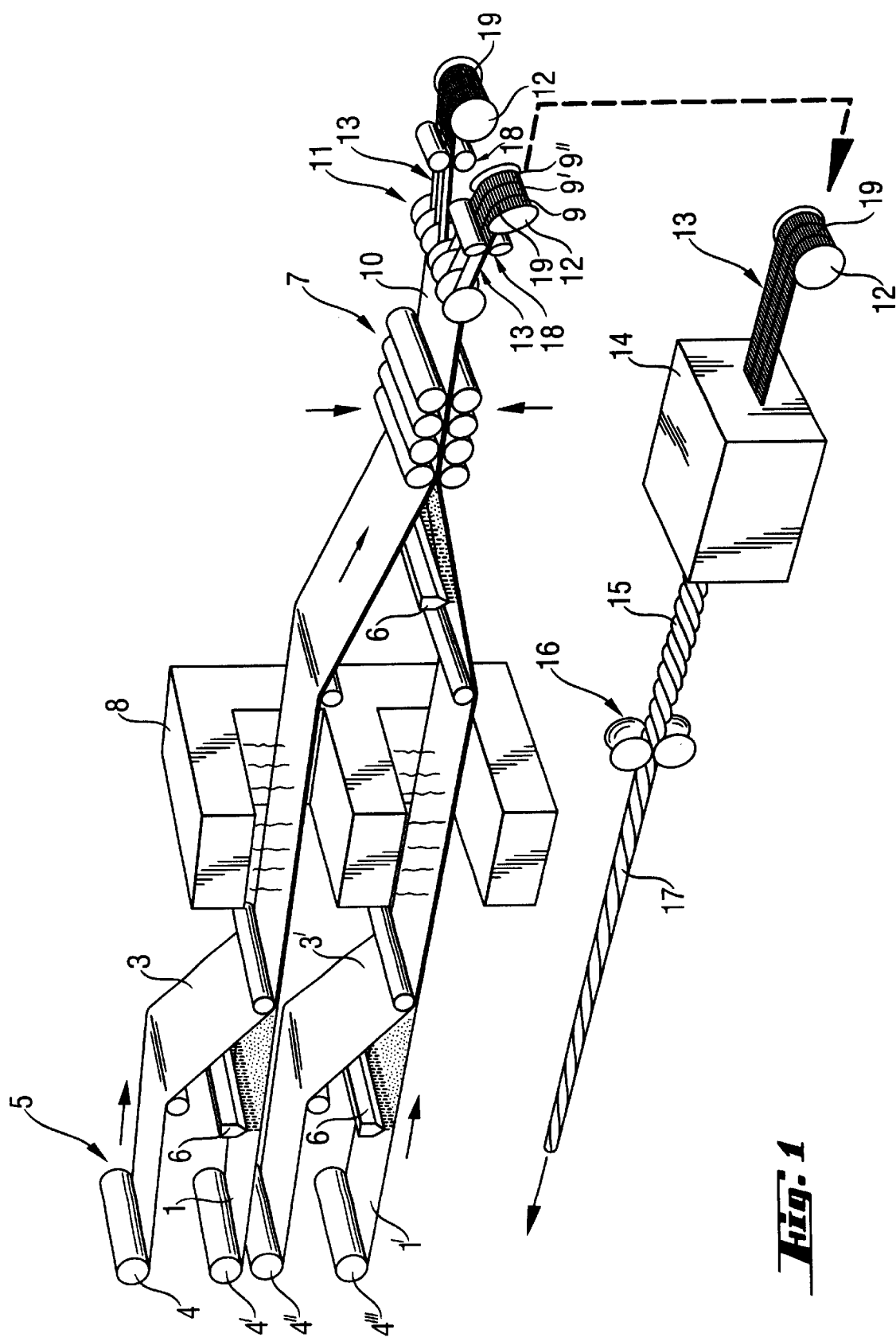
FIG. 1 is a diagrammatic, perspective view illustrating a continuous or partially continuous method of manufacturing packing yarns according to the invention.

Referring now to the figures of the drawings in detail and first, particularly, to FIG. 1 thereof, there is seen an illustration of a preferably used continuous or partially continuous method, in which graphite foils 1, 1' and metal foils 3, 3' that are to be joined together are simultaneously unwound by rollers 4, 4', 4'', 4''' which are suitably disposed in a roller stand 5, in such a way that the foils 1, 1', 3, 3' may be precisely superimposed and joined together. If the joining is to be effected by adhesion or by a method according to European Patent Application 0 616 884 A2, then, prior to superimposition of the foils 1, 1', 3, 3', at least one of the two surfaces to be joined to one another in each case has to be provided with a thin coating of adhesive or coupling agent. This may be effected, for example, by spraying or wiping devices 6 or by coating rollers or by combinations thereof. Where the consistency of the adhesive or coupling agent allows, application may alternatively be effected by dipping, which is not illustrated herein. In the case of joining through the use of welding, which is likewise not illustrated and is suitable only for the variants in which specific flat sides of the laminates made of graphite and metal foils are additionally to be joined to plastic foils, such coating apparatuses are not needed. Joining of the graphite foils to the metal foils is effected at roller frames or belt presses 7 which, where necessary, are either self-heatable or have an upstream heating device 8 such as, for example, a furnace. Through the use of the heating, the foils 1, 1', 3, 3' or a sandwich structure of the foils 1, 3, 1', 3' is heated up to the required temperature for joining.

In order to carry out the non-illustrated manufacture of laminates composed of a higher number of graphite-and metal foils, or in cases where it is appropriate for other reasons, e.g. for the additional introduction of plastic foils into the laminate, it is also possible in a preceding production step to manufacture laminates including a few foil layers and then, by joining such prefabricated laminates, to produce the laminate intended for further processing into the bands.

In order to manufacture bands 9, 9', 9'' from laminates 10 of the graphite foils 1, 1' and the metal foils 3, 3', the respective laminate 10 is cut in a second process stage according to Table 1. This is accomplished through the use of conventional cutting devices 11 which cut in a longitudinal direction to produce the bands 9, 9', 9" having a required width, which is advantageously less than 5 mm. In the continuous process, the cutting operation is directly linked to the preceding process of manufacturing the laminate 10 from the foils 1, 1', 3, 3'. For practical reasons, the cutting or splitting of the laminate webs into the bands of the width required for manufacture of the yarns may be effected in two stages, particularly in the case of laminates of greater width. First, the laminate web is split into widths of medium size and then the webs of medium width are cut to the desired final width of the bands. This last method is not illustrated in FIG. 1. Cutting is effected by the conventional cutting devices 11, preferably continuously with the aid of cutting cylinders. The laminates 10 prior to being split into the bands 9, 9', 9", or the bands 9, 9', 9" that are already cut either to an interim width or to the final width, are preferably fed through an embossing apparatus having at least one suitably equipped embossing roller 18 and are thereby provided with a fluting 19 or corrugation 19 extending transversely to their longitudinal extension. In FIG. 1, this embossing roller 18 is disposed downstream of the cutting device 11 in accordance with the preferred procedure. The bands 9, 9', 9" which are thus produced are either wound onto bobbins 12 for further processing in a subsequent, separate process step or they are combined directly in a continuous process into the band number required for subsequent processing. This is performed in a manner likewise not illustrated in FIG. 1, in the third process stage according to Table 1, by a textile method, namely braiding, knitting or preferably twisting, and they are processed into a packing yarn 15. When the textile processing is to be effected by twisting, it is advantageous if the number of bands 9, 9', 9" required for twisting are wound onto an optionally suitably subdivided bobbin 12, immediately after cutting. In order to carry out the twisting, it is then only necessary for a strand 13 including the predetermined number of bands 9, 9', 9" to be withdrawn from the bobbin 12 and twisted. Twisting is effected through the use of apparatuses 14 of the type which are used, for example, to manufacture cables or yarns. The packing yarns 15 which are thus produced are then used to manufacture packings. In special cases, however, the packing yarns 15 obtained after joining of the bands 9, 9', 9" by a textile method may additionally be calibrated with the aid of conventional, known apparatuses 16 into packing yarns 17 having a strictly defined surface contour and a specific yarn cross section. The yarns do, however, lose some of their flexibility as a result.

Figure 2:
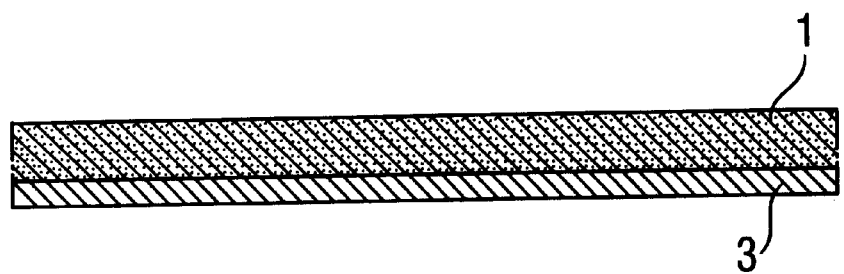
FIG. 2 is a cross-sectional view of a laminate band formed of a layer of flexible graphite and a metal foil, in which a joint between components was produced through the use of a coupling agent.

FIG. 2 illustrates a cross section through a laminate band having a layer of 0.5 mm thick flexible graphite 1 with a bulk density of 1.0 g/cm$^3$, which has been joined at one of its flat sides through the use of the method according to European Patent Application 0 616 884 A2, using a siloxane/fatty alcohol mixture as a coupling agent, to a 25 μm thick foil 3 of electrolytic nickel. The other flat side of the graphite foil 1 is free of any covering.

Figure 3:
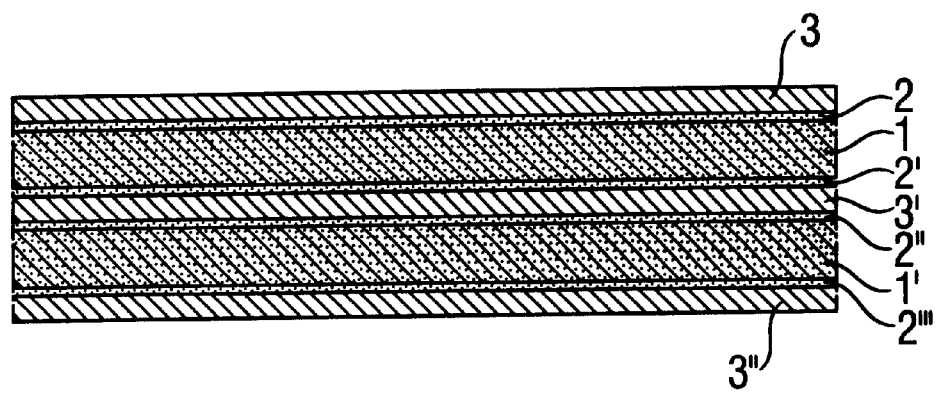
FIG. 3 is a cross-sectional view of a laminate band formed of two layers of flexible graphite and three metal foils, in which the foils are glued to one another.

FIG. 3 shows a cross section through a laminate band including two 0.5 mm thick graphite foils 1, 1' having a bulk density of 1.0 g/cm$^3$ and three 35 μm thick metal foils 3, 3', 3" of electrolytic copper. The graphite foils 1, 1' are joined to the metal foils 3, 3', 3", through the use of an epoxide resin adhesive 2, 2', 2", 2'". In this laminate band, the two outer flat sides of the graphite foils 1, 1' are each covered by a respective metal foil 3, 3".

Figure 4:
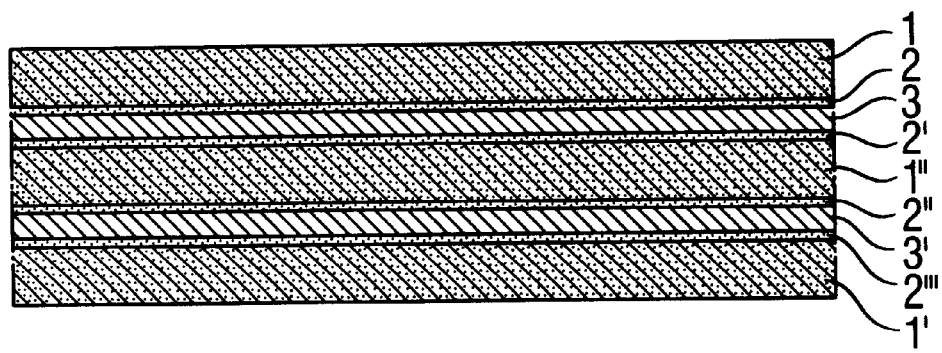
FIG. 4 is a cross-sectional view of a laminate band formed of three layers of flexible graphite, between which are situated two layers of metal foil, that are joined to the graphite layers through the use of an adhesive.

FIG. 4 shows a cross section through a laminate band including a top layer 1, a middle layer 1" and a bottom layer 1' of 0.20 mm thick graphite foil having a bulk density of 1.2 g/cm$^3$ and two 50 μm thick foils 3, 3' of superpure aluminum. The metal foils 3, 3' are situated between the graphite foils 1, 1', 1" and are joined to the latter through the use of an acrylate adhesive 2, 2', 2", 2'". The two outwardly directed flat sides of the graphite foils 1, 1' are accordingly without a covering.

Figure 5:
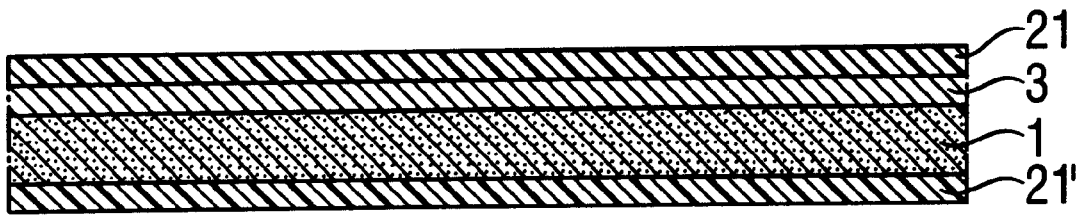
FIG. 5 is a cross-sectional view of a laminate band formed of a layer of flexible graphite and a layer of metal foil, with two outer flat sides being joined in each case to a plastic foil.

FIG. 5 illustrates a cross section through a type of laminate band which, in addition to a graphite foil 1 and a metal foil 3 that in this case is formed of special or stainless steel, also contains two plastic foils 21, 21' made of polytetrafluoroethylene (PTFE). The top PTFE foil 21 and the bottom PTFE foil 21' are each welded in an adhesive-free manner to a respective one of the underlying layers 3, 1 of the metal foil 3 and the graphite foil 1, respectively. The top combination of the PTFE foil 21 and the metal foil 3 joined thereto was manufactured in a separate production step, as was the bottom combination of the graphite foil 1 and the PTFE foil 21'. The two combinations were then joined together over the entire surface at their plastic foil-free flat sides using the method according to European Patent Application 0 616 884 A2. Such a procedure may be suitably modified and also used to manufacture laminates of a different structure. It is also particularly suitable for manufacturing laminates including a plurality of layers of graphite foil, metal foil and, optionally, plastic foil. The graphite foil 1 has a thickness of 0.5 mm and a bulk density of 1.2 g/cm$^3$. The metal foil has a thickness of 25 μm and the PTFE foils have a thickness of 30 μm. Such laminate bands, especially when they are provided with a fluting, present very good processing properties, and the packings manufactured from them present very good sealing properties, are corrosion-resistant, heat-resistant and slidable.

Figure 6:
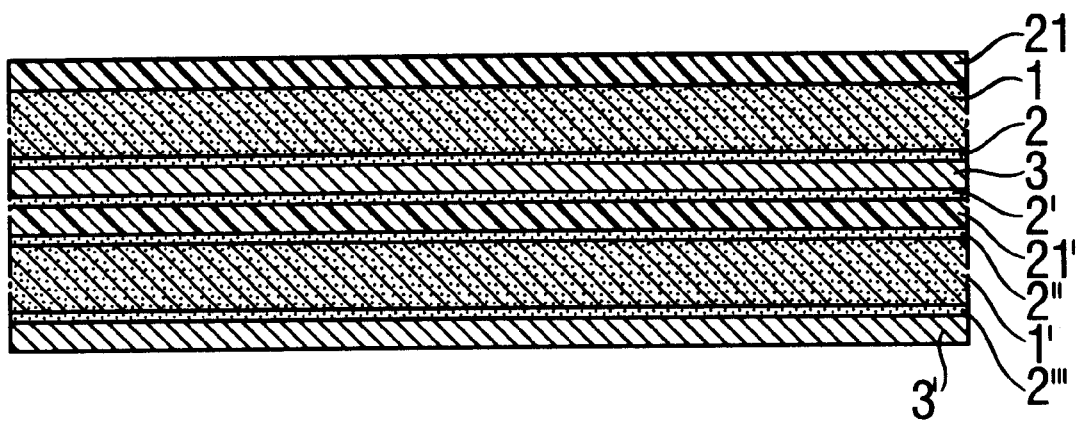
FIG. 6 is a cross-sectional view of a laminate band formed of two layers of flexible graphite, two layers of metal foil and two layers of plastic foil, with one layer each of the metal and plastic foils being disposed at the inside and the other two layers of the plastic and metal foils being situated at the outer flat sides of the laminate band.

FIG. 6 shows a cross section through a laminate band, which includes two graphite foils 1, 1' having a thickness of 0.38 mm and a bulk density of 1.1 g/cm$^3$, two metal foils 3, 3' and two plastic foils 21, 21'. One plastic foil 21 of the plastic foils 21, 21' is made of PTFE, forms a first outer surface of the laminate band, is welded to the graphite foil 1 and is 50 μm thick. The other plastic foil 21' is 12 μm thick and is made of polyester. The other plastic foil 21' is disposed at the inside of the laminate band between a metal foil 3 of 50 μm thick superpure aluminum and the graphite foil 1' and is joined to these foils 3, 1 through the use of an acrylate adhesive 2', 2". One foil 3' of the two metal foils 3, 3' forms a second outer flat side or surface of the laminate band. The metal foil 3' is made of pure nickel, is 13 μm thick and is joined to its underlying layer formed of the graphite foil 1' through the use of an acrylate adhesive 2'". The same adhesive 2 was also used to join the graphite foil 1 to the aluminum foil 3.

FIG. 7 shows a plan view of a packing yarn 15, 17 having a structure which is shown in a cross-sectional view and is composed of two different types of laminate bands 9, 9a. The first type is a laminate band 9 including at least one graphite foil 1, . . . and at least one metal foil 3. The second type is a laminate band 9a including at least one graphite foil 1, . . . and at least one plastic foil 21, . . . (hybrid yarn). In the present case, two of such bands 9, 9a are twisted into a packing yarn. The one laminate band 9 includes two graphite foils 1, 1' and two metal foils 3, 3' of electrolytic nickel, which are alternately disposed and joined together by the method according to European Patent Application 0 616 884 A2 using a siloxane/fatty alcohol mixture as a coupling agent. The other laminate band 9a includes two graphite foils 1, 1', each of which is welded at its outer flat side to a respective plastic foil 21, 21' made of PTFE. Situated in the interior of the laminate band 9a is a third plastic foil 21' made of polyimide, which is disposed between the two graphite foils 1, 1' and welded to each of the latter. In this way too, it is possible to create packing yarns and, from the latter, packings having special processing and functional properties.

It is not difficult to see that many more possible laminates may be formed by modifying the exemplary embodiments indicated by FIGS. 2 to 7 according to the teaching of the invention. The invention is accordingly not limited to the exemplary embodiments illustrated in the drawings. For this reason, the present patent application is also to include the non-illustrated laminates which the person skilled in the art, on the basis of the information supplied to him or her by the present disclosure, might manufacture and process into packing yarns.

We claim:

1. A packing yarn, comprising:

at least two bands each having a width of at most 5 mm, said bands formed of a laminate, and said bands joined to one another by a yarn manufacturing method;

said laminate formed of mutually joined, alternately disposed layers of at least two laminar materials;

said layers including a top layer and a bottom layer with outer flat sides; and said layers including at least one first layer of flexible graphite having a thickness of at most 1 mm and a bulk density in the region of 0.7 to 1.8 g/cm$^3$, and at least one second layer of a reinforcing agent formed of metal foil selected from the group consisting of nickel, nickel alloys, iron, iron alloys, steel, stainless steel, copper, copper alloys, aluminum and aluminum alloys having a thickness in the region of 5 to 50 μm and a tensile strength of at least 250 MPa.

2. The packing yarn according to claim 1, wherein both of said top and bottom layers with said outer flat sides are formed of flexible graphite.

3. The packing yarn according to claim 1, wherein one of said top and bottom layers with said outer flat sides is formed of flexible graphite.

4. The packing yarn according to claim 1, wherein none of said top and bottom layers with said outer flat sides is formed of flexible graphite.

5. The packing yarn according to claim 1, wherein said bands additionally contain at least one plastic foil.

6. The packing yarn according to claim 5, wherein said plastic foil is made of a fluoropolymer.

7. The packing yarn according to claim 1, wherein said metal foil is made of a material selected from the group consisting of pure nickel and corrosion-resistant steel.

8. The packing yarn according to claim 1, wherein said bands have a longitudinal direction and are fluted transversely to said longitudinal direction.

9. The packing yarn according to claim 1, wherein at least one of said two bands is separately twisted prior to processing of said bands into the packing yarn.

10. The packing yarn according to claim 1, wherein said bands have a width of at most 3 mm, and said at least one graphite layer includes at least one graphite foil disposed in said bands and having a thickness of at most 0.5 mm.

11. The packing yarn according to claim 1, wherein said bands have a width of at most 2 mm, and said at least one graphite layer includes at least one graphite foil disposed in said bands and having a thickness of at most 0.35 mm.

12. The packing yarn according to claim 1, wherein said at least one layer of flexible graphite is at least one flexible graphite foil, and said reinforcing metal foil has a thickness in the region of 10 to 30 μm.

13. The packing yarn according to claim 1, including a plastic foil selected from the group consisting of perfluorinated polymeric hydrocarbons, polyester and polyimide, covering and joining at least one of two upwardly and downwardly directed outer flat sides of said bands.

14. The packing yarn according to claim 1, wherein said at least one layer of flexible graphite has a carbon content of at least 96% by weight.

15. The packing yarn according to claim 1, wherein said at least one layer of flexible graphite has a carbon content of at least 99% by weight.

16. The packing yarn according to claim 1, including adhesive joining said reinforcing metal foil to said at least one layer of flexible graphite.

17. The packing yarn according to claim 1, wherein said reinforcing metal foil is joined to said at least one layer of flexible graphite without an adhesive.

18. The packing yarn according to claim 1, wherein said reinforcing metal foil is joined to said at least one layer of flexible graphite by drawing said reinforcing metal foil through a bath of a coupling agent solution, spreading the coupling agent, drying said reinforcing metal foil and covering both sides of said reinforcing metal foil with said at least one layer of flexible graphite.

19. The packing yarn according to claim 1, wherein said bands are twisted together.

20. The packing yarn according to claim 1, wherein said bands include at most 12 bands twisted together.

21. The packing yarn according to claim 1, wherein said bands are twisted together, and said at least one layer of flexible graphite in each of said bands includes up to four superimposed layers of flexible graphite each joined to at least one reinforcing metal foil.

22. A packing yarn, comprising:

at least two bands each having a width of at most 5 mm, said bands formed of a laminate, and said bands joined to one another by a yarn manufacturing method;

said laminate formed of at least one layer of flexible graphite having two flat sides, and at least one layer of reinforcing agent joined to at least one of said two flat sides;

said at least one layer of flexible graphite having a thickness of at most 1 mm and a bulk density in the region of 0.7 to 1.8 g/cm$^3$; and said at least one layer of reinforcing agent formed of a metal foil selected from the group consisting of nickel, nickel alloys, iron, iron alloys, steel, stainless steel, copper, copper alloys, aluminum and aluminum alloys having a thickness in the region of 5 to 50 μm and a tensile strength of at least 250 MPa.

23. The packing yarn according to claim 22, wherein said bands additionally contain at least one plastic foil.

24. The packing yarn according to claim 23, wherein said plastic foil is made of a fluoropolymer.

25. The packing yarn according to claim 22, wherein said metal foil is made of a material selected from the group consisting of pure nickel and corrosion-resistant steel.

26. The packing yarn according to claim 22, wherein said bands have a longitudinal direction and are fluted transversely to said longitudinal direction.

27. The packing yarn according to claim 22, wherein at least one of said two bands is separately twisted prior to processing of said bands into the packing yarn.

28. The packing yarn according to claim 22, wherein said bands have a width of at most 3 mm, and said at least one graphite layer includes at least one graphite foil disposed in said bands and having a thickness of at most 0.5 mm.

29. The packing yarn according to claim 22, wherein said bands have a width of at most 2 mm, and said at least one graphite layer includes at least one graphite foil disposed in said bands and having a thickness of at most 0.35 mm.

30. The packing yarn according to claim 22, wherein said at least one layer of flexible graphite is at least one flexible graphite foil, and said reinforcing metal foil has a thickness in the region of 10 to 30 $\mu$m.

31. The packing yarn according to claim 22, including a plastic foil selected from the group consisting of perfluorinated polymeric hydrocarbons, polyester and polyimide, covering and joining at least one of two upwardly and downwardly directed outer flat sides of said bands.

32. The packing yarn according to claim 22, wherein said at least one layer of flexible graphite has a carbon content of at least 96% by weight.

33. The packing yarn according to claim 22, wherein said at least one layer of flexible graphite has a carbon content of at least 99% by weight.

34. The packing yarn according to claim 22, including adhesive joining said reinforcing metal foil to said at least one layer of flexible graphite.

35. The packing yarn according to claim 22, wherein said reinforcing metal foil is joined to said at least one layer of flexible graphite without an adhesive.

36. The packing yarn according to claim 22, wherein said reinforcing metal foil is joined to said at least one layer of flexible graphite by drawing said reinforcing metal foil through a bath of a coupling agent solution, spreading the coupling agent, drying said reinforcing metal foil and covering both sides of said reinforcing metal foil with said at least one layer of flexible graphite.

37. The packing yarn according to claim 22, wherein said bands are twisted together.

38. The packing yarn according to claim 22, wherein said bands include at most 12 bands twisted together.

39. The packing yarn according to claim 22, wherein said bands are twisted together, and said at least one layer of flexible graphite in each of said bands includes up to four superimposed layers of flexible graphite each joined to at least one reinforcing metal foil.

40. A packing yarn, comprising:
at least two bands formed of at least two different laminates, said bands joined together by a yarn manufacturing method; and
said at least two different laminates including:
a first laminate having at least one foil of flexible graphite and at least one foil of metal, and
at least one second laminate having at least one foil of flexible graphite and at least one plastic foil with a tensile strength of at least 25 MPa and an elastic modulus of at least 0.4 GPa.

41. The packing yarn according to claim 40, wherein said bands are twisted together.

42. The packing yarn according to claim 40, wherein said bands include at most 12 bands twisted together.

43. The packing yarn according to claim 40, wherein said bands are twisted together, each of said bands includes up to four superimposed foils of flexible graphite, each of said foils of flexible graphite in said first laminate is joined to at least one foil of metal, and each of said foils of flexible graphite in said at least one second laminate is joined to at least one plastic foil.

* * * * *

UNITED STATES PATENT AND TRADEMARK OFFICE
CERTIFICATE OF CORRECTION

PATENT NO. : 6,385,956 B1
DATED : May 14, 2002
INVENTOR(S) : Oswin Öttinger et al.

It is certified that error appears in the above-identified patent and that said Letters Patent is hereby corrected as shown below:

Column 2,
Line 56, should read:
-- material. However, a width of the graphite foil bands, which --

Column 16,
Line 67, should read:
-- respective plastic foil 21, 21" made of PTFE. Situated in the --

Signed and Sealed this

Fourteenth Day of January, 2003

JAMES E. ROGAN
*Director of the United States Patent and Trademark Office*